(12) United States Patent
Yona et al.

(10) Patent No.: US 6,418,120 B1
(45) Date of Patent: Jul. 9, 2002

(54) CONGESTION AVOIDANCE MECHANISM FOR ATM SWITCHES

(75) Inventors: Nir Yona; Yossi Ben-Moshe, both of Holon (IL)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 08/938,254

(22) Filed: Sep. 26, 1997

(30) Foreign Application Priority Data

Aug. 11, 1997 (IL) .................................................. 121519

(51) Int. Cl.[7] .................................................. H04J 3/14
(52) U.S. Cl. ...................................... 370/236; 370/413
(58) Field of Search ................................. 370/232, 236, 370/395, 397, 398, 401, 413, 468, 383, 235, 414, 417, 418; 395/200.8

(56) References Cited

U.S. PATENT DOCUMENTS

| | | | | |
|---|---|---|---|---|
| 5,440,547 A | * | 8/1995 | Easki et al. .................. 370/395 |
| 5,493,566 A | * | 2/1996 | Ljungberg et al. ........... 370/235 |
| 5,550,823 A | * | 8/1996 | Irie et al. ..................... 370/413 |
| 5,790,522 A | * | 8/1998 | Fichou et al. ................ 370/236 |
| 5,838,904 A | * | 11/1998 | Rostoker et al. ......... 395/200.8 |
| 5,949,778 A | * | 9/1999 | Abu-Amara et al. ........ 370/388 |

\* cited by examiner

*Primary Examiner*—Chau Nguyen
*Assistant Examiner*—Alexander O. Boakye

(57) ABSTRACT

The invention relates to data switching and particularly to a method and apparatus for transferring data arranged in cells across a data switch having at least one input port and a plurality of output ports, the cells each having a data section and address information, the method comprising the steps of sending a control cell from each output port to each input port to indicate whether the respective output port is able to receive data, receiving a data cell at said at least one input port, reading said address information from said received data cell, sending said data cell to each output port indicated by said address information only if said output cell is able to receive data, and otherwise retaining said data cell. The invention is particularly relevant to ATM switching and the B-ISDN protocol.

3 Claims, 4 Drawing Sheets

CONGESTION AVOIDANCE MECHANISM FOR ATM SWITCHES

FIELD OF THE INVENTION

The present invention relates to ATM switches and more particularly to improving utilization efficiency of the switching apparatus.

BACKGROUND OF THE INVENTION

The ATM protocol is an underlying concept of the B-ISDN system widely in use today by Telecom companies. It provides connection-orientated communication. It divides data into cells, typically 48 bytes long with an additional 5 bytes for use with the protocol, thus enabling data transmission with only a 10.4% overhead. The address data in each cell is location data specific to the two units exchanging data so that the individual communication can be routed through the most convenient channel available at the time. An advantage of the system is that it can accommodate large numbers of heavy users without mutual interference.

In order to enable such a protocol, a switch is required at the center of the network to route cells. It must have the intelligence to identify the address information and interpret it correctly. As the communications are generally asynchronous it must have the ability to buffer the cells if they cannot be sent immediately and the buffering must be able to cope with the large volumes of data that are likely to appear all at once whenever there are a large number of users. Any communication using ATM requires a handshake protocol between the two communicating units to set up the link in the first place.

There are two known types of ATM switch, the type used in global or wide area networks WANs, known as public ATM switches, and the type used in local area networks, LANs, known as private ATM switches.

The use of a switch in a network implies that incoming data is all sent to a central logical point where the switch is located and where the data can then be directed to its destination. The very existence of such a central location implies the potential for a bottleneck in the system before beginning to take into account the question of delays introduced by the switching operation itself.

It has therefore been a major concern within the field of network switching design to remove any potential for delay and maximize the efficiency of the switch.

ATM switches receive data cells at input ports and process the data in the cell headers to direct the cell to the appropriate output port. In practice the analysis of the cell header results in the cell being tagged with the output port address. The cell is then output onto the data bus and eventually received by the output port corresponding to the tag. The output port sends an acknowledgment to indicate that it has safely received the cell. If the output, or destination, port is occupied then this acknowledgment is not received. The input cell will assume that the data was not received, and will resend the original cell in the next data cycle. It will continue to send the cell until the appropriate response is received. The original cell is stored meanwhile in the input port data buffer. In a more advanced approach it will attempt to send another cell to a different destination in the next cycle and will wait for several cycles before attempting to send the first cell again.

The most likely reason that the data was not received was that the data buffer at the output port was temporarily occupied serving another cell source. Whether this is the case or not the outcome is that the cell is sent at least twice and thus bandwidth of the internal bus cycle of the switch is wasted. The simplest way to deal with the problem, and a solution that is widely used, is to increase the bandwidth within the switch. This increases the number of components, hence the cost of the system and the likelihood that something will go wrong, and of course means that most of the bandwidth is unused most of the time.

In the case of point to multipoint communication, that is to say when the cell that is received is to be sent to more than one of the output ports, then the extent of wasted cycle bandwidth increases. As the individual cell has to be sent separately to each of the required output ports, during times of particularly heavy traffic this can lead to the collapse of what is essentially a trial and error algorithm. Even if extra bandwidth is provided, as mentioned above, it is unlikely to be sufficient in these circumstances.

SUMMARY OF THE INVENTION

It is an object of the invention to provide a means of transmitting a cell from an input port only when the relevant output port is available to receive it.

According to a first aspect of the invention there is provided a data switch having at least one input port and a plurality of output ports, wherein the input port and the plurality of output ports have associated data buffers and wherein the input ports are connected to the output ports via a data transfer mechanism, wherein the at least one input port is arranged to engage in a handshake protocol with at least one of the output data buffers, from which it is able to determine whether the output data buffer is available to receive data.

Preferably, when a data cell that is to be switched is received at the input port, address information from the cell is used to determine which of one or more output ports it should be sent to. The list of one or more output ports that is obtained is then compared with the output ports that are available to receive data, and the cell is only sent to those output ports that are currently available. If any of the required output ports are not available then the cell is held in the input buffer data port, and is sent to each such output port as soon as it becomes available.

According to a second aspect of the invention there is provided a method of transferring data arranged in cells across a data switch operating in a cyclical manner. The switch has at least one input port and a plurality of output ports, the cells each have a data section and address information. The method begins with the step of sending control cells, or missionary cells, from the input port to each one of the output ports, sending a signal from each output port back to the input port, under the influence of the control cell, to indicate whether the output port to which it has been sent is able to receive data during a present data cycle, receiving a data cell at the input port, reading the address information from the received data cell to determine one or more output ports indicated by the address information, sending the data cell to each output port which is indicated by the address information and which is able to receive data, and if any output ports indicated by the address information are unable to receive data then retaining said data cell.

Preferably the data cell so retained is sent to the presently unavailable output ports during the first data cycle following the present data cycle during which the respective output port indicates that it is available.

BRIEF DESCRIPTION OF THE DRAWINGS

For a better understanding of the invention and to show how the same may be carried into effect, reference will now be made, purely by way of example, to the accompanying drawings in which.

DESCRIPTION OF THE PREFERRED EMBODIMENTS

Figure 1:
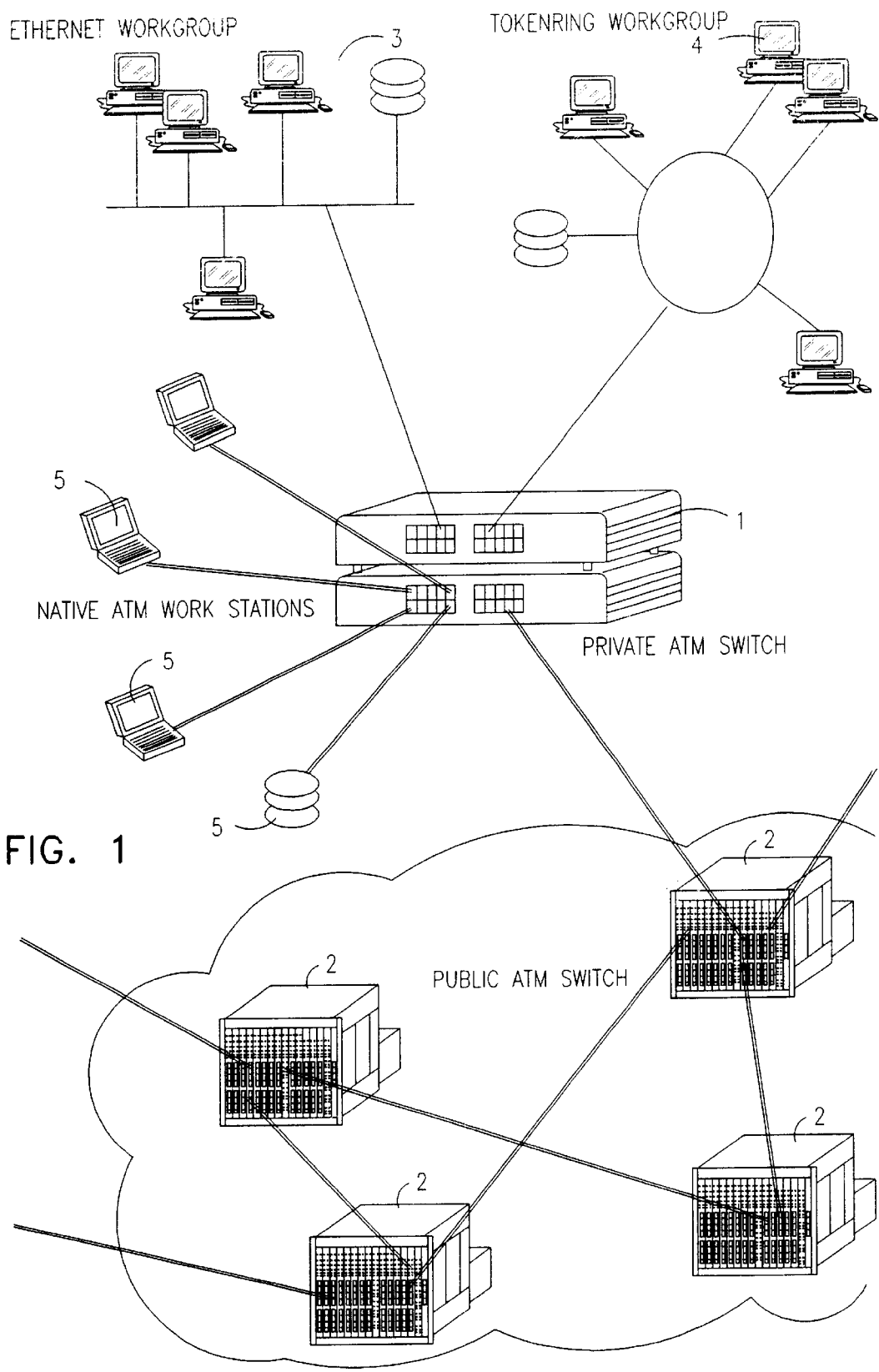
FIG. 1 shows devices according to the invention in use in data networks.

FIG. 1 shows a configuration of private 1 and public 2 ATM switches. The private switch 1 is shown controlling an ethernet workgroup 3 and a token ring workgroup 4, as well as native ATM work stations 5. These are simply by way of example.

The private ATM network is shown connected to a public ATM network made up of a series of ATM switches 2. The public ATM network would typically be a national (or international) digital telephone network.

Figure 2:
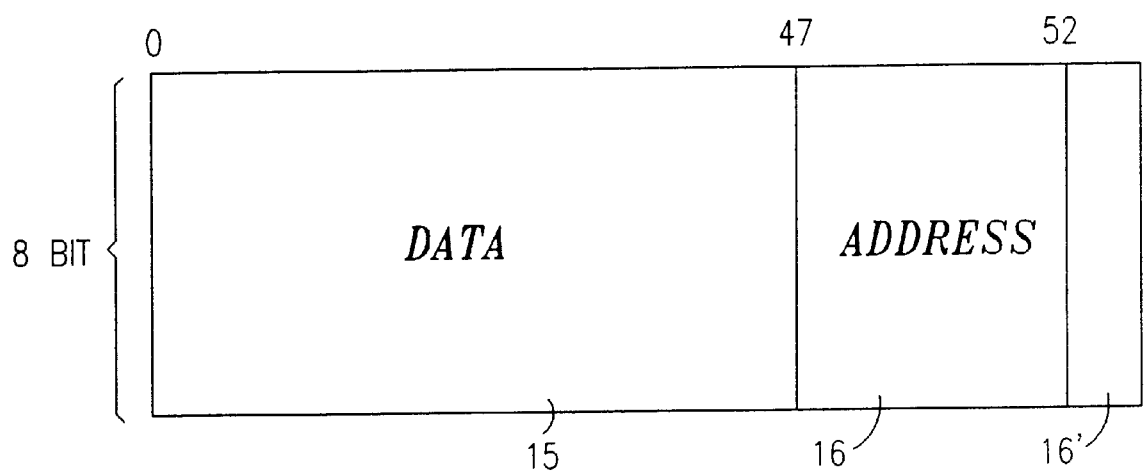
FIG. 2 shows a data cell for use with the invention.

As discussed above data is arranged in packets or cells as shown in FIG. 2, each having a data section 15 of typically 48 bytes and a control section 16 of typically 5 additional bytes for protocol information, that is to say, in the main, address information. An additional section 16' of interswitch address data can be tagged on to the cell at various stages of its journey.

Figure 3:
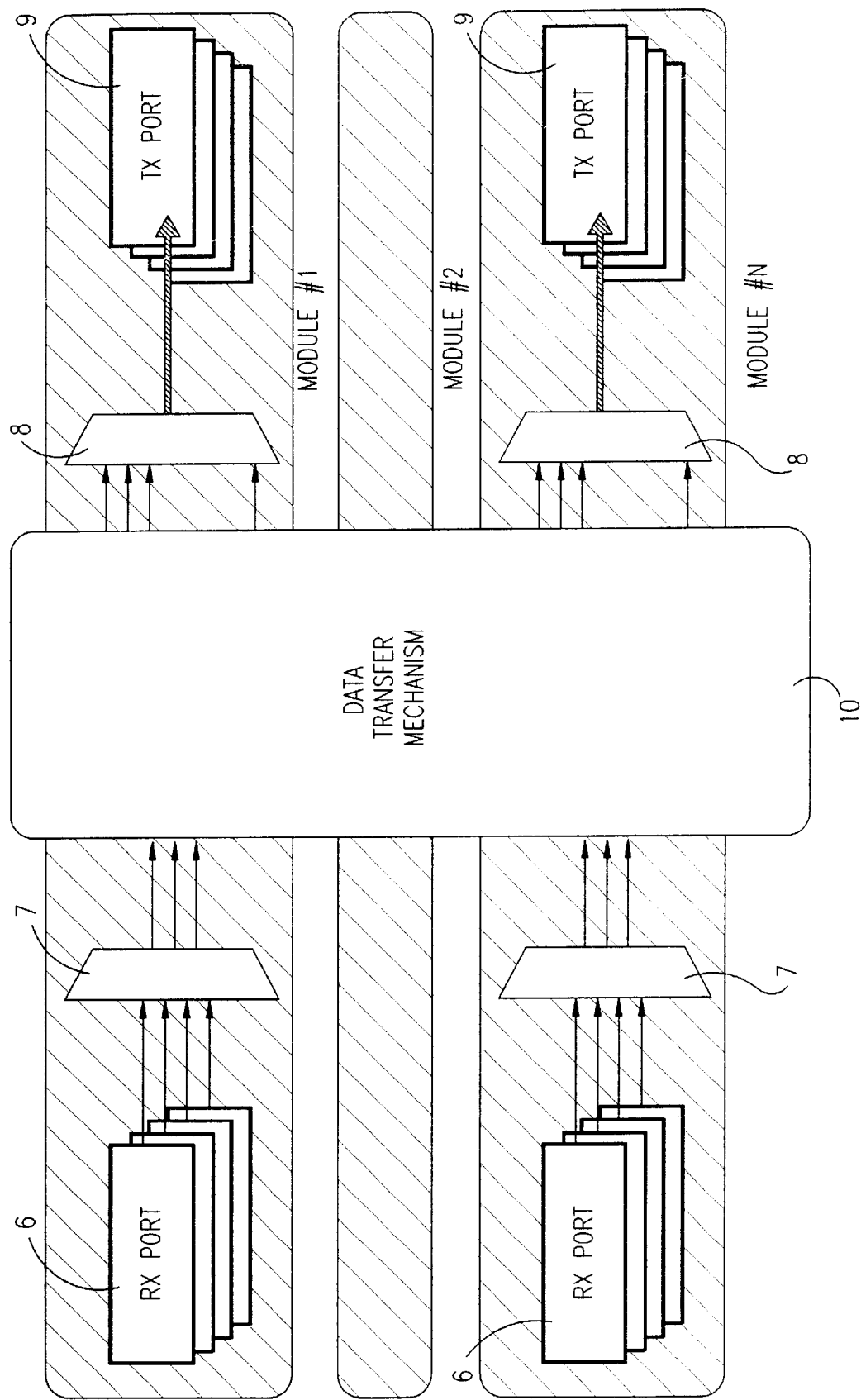
FIG. 3 shows a device according to the invention.

Data is passed along the network asynchronously until it reaches an input port 6 of one of the switches. FIG. 3 shows a switch according to the invention. The switch itself is a synchronous device. Upon receipt of a data cell it is held in the input port buffer 7 until the next cycle of the internal bus of the switch. In general in a synchronous device it is possible to assume that data sent during a valid cycle is safely received and confirmation is not generally needed. In the case of a data switch the same does not apply as all of the input ports are equally able to send to any of the output ports at any given cycle. Furthermore there is no guarantee that data from previous cycles has not been kept in the buffer. It is thus possible that the data was not received because the data buffer was full.

In a first embodiment of the invention the incoming data is point to point, that is to say that it is to be sent to a single output port 9. The output buffer 8 holds a single reserved place of one cell for each input port. If the respective reserved place is available then the output buffer sends a cell, known as a missionary cell, to the input port data buffer 6. The missionary cell contains simple "yes" or "no" information and thus is able to indicate whether the space is available in the output port 8 to receive the data cell. It represents the front edge of the output buffer to the input ports. Thus the missionary cell represents a handshake arrangement with the input ports so that the input ports can be informed as to where the front edge of the buffer is and thus when there is no space available in the output buffer 8. When the input port 6 is thus able to determine that there is no space available in the output buffer 8 then it simply holds the data cell in its buffer 7, rather than send it. The cell is kept in the input buffer 7 until an indication is received that the output buffer 8 can again receive data. For the missionary cell to work in this manner no major modification is needed to the system as, even in the prior art, the data cells acknowledge their safe receipt at the output port 9 by means of a handshake signal. As part of the handshake signal the input port 6 is informed of the current position of the front edge of the buffer.

In a second embodiment of the invention thee incoming data is point to multipoint. That is to say the individual data cells are to be sent to more than one output port. As in the first embodiment the output port sends missionary cells to the input ports, which are thus able to determine which of the output ports are able to receive data. In conventional systems an incoming cell indicating multiple addresses would simply be replicated the requisite number of times and each replicated cell would be sent to one of the required output ports. Each such replication/send operation would take a full data cycle. In the event that some of these output ports are full, the respective replicated cell would simply be sent again and again until receipt is acknowledged. Only then would it proceed to send the cell to the next required output port. Or alternatively the port would proceed to send the cell to other ports during subsequent cycles and return to the first port at a later time. It will be appreciated by the user that bandwidth can rapidly become overloaded in these circumstances, and furthermore the input port can become occupied for a great deal of time.

Thus in the embodiment the incoming cell is tagged with a destination mask, known as the Destination Comb. This is essentially a list of output ports to which the cell can be sent. However because the output ports that are presently available for receiving data are known, the Destination Comb only contains the output ports that are available for that cycle. The cell is sent to these available output ports and a copy is kept in the input buffer for the next cycle. In the next cycle a new Destination Comb is constructed containing those of the required output ports that were not available previously but which are available in the new cycle, and the cell is sent to the ports in the new comb. The process continues until the cell has been sent to all of the required output ports.

In the typical case in which the switch is unloaded, the comb will consist of a full mask of destination ports.

Figure 4:
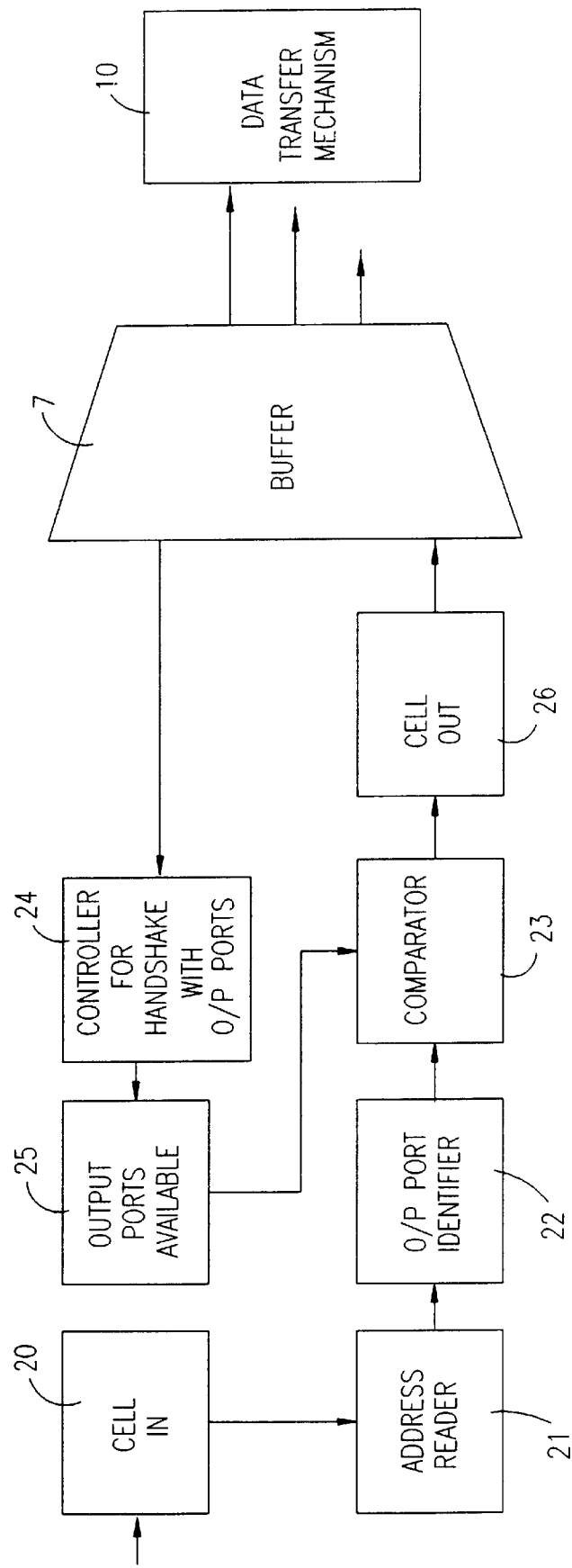
FIG. 4 shows a part of the device of FIG. 3.

FIG. 4 shows the input port 6 of the switch in more detail. The incoming cell is received by the cell-in device or input buffer 20 of the port 6. The address information is read by an address reader 21. An output port identifier 22 interprets the address information so read in terms of the output ports in the device. A comparator 23 compares the list of output ports identified by the identifier 22 with the list of output ports that are available to receive data from that input port in the current cycle. If only one output port is required by the cell and it is available then the cell is simply output to a data transfer mechanism, in this embodiment data bus 10, via sending means 26. If no required output ports are available then the cell is kept in the input buffer 20 and the process is repeated in the following cycle. If more than one port is required and only a subsection of the required ports are available then a copy of the cell is retained in the input buffer 20 and a destination comb as described above is attached to the data cell by the sending device 26 so that it can be sent in one go to all of the required output ports that are available.

A controller 24, that governs the handshake protocol with the output ports, is present in each input port 6. At the beginning of each data cycle it receives the missionary cell described above from each output port.

The missionary cell arrives in the input port data buffer 6. Its function is to indicate the availability of a place in the buffer 8 for data sent from the input port 6. The handshake controller 24 then flags the output port as being available/not available, in a port availability table 25. Information from the port availability table 25 is passed to the comparator 23 to enable a decision to be made as to whether the cell can be sent. The sending device 26 then sends its data cell, which is now guaranteed a place in its destination buffer.

What is claimed is:

1. Data switch apparatus comprising:

a plurality of output ports;

at least one input ports receiving incoming data units each having a data section and destination address information;

a data transfer mechanism effecting a point to multipoint transfer of data by sending at least one incoming data unit from one of the at least one input ports to more than one output port from among the plurality of output ports;

a plurality of output buffers between the data transfer mechanism and the plurality of output ports respectively, each output buffer holding at least one reserved place of one data unit for each input port;

wherein each output buffer is operative to send a yes/no message to each individual input port indicating whether or not the at least one reserved place for said individual input port in said output buffer is available, and wherein each of the at least one input ports holds each incoming data unit at least until the yes/no message from the output buffer corresponding to that data unit's destination address indicates that that output buffer is available to receive data.

2. Apparatus according to claim 1 wherein said incoming data units comprise data cells.

3. A data switching method comprising:

receiving incoming data units each having a data section and destination address information;

effecting a point to multipoint transfer of data by sending at least one incoming data unit from an input port to more than one output port from among a plurality of output ports;

providing a plurality of output buffers between the data transfer mechanism and the plurality of output ports respectively and holding in each output buffer at least one reserved place of one data unit for each of at least one input ports; and sending a yes/no message from each output buffer to each individual input port indicating whether or not the at least one reserved place for said individual input port in said output buffer is available, and wherein each of the at least one input ports holds each incoming data unit at least until the yes/no message from the output buffer corresponding to that data unit's destination address indicates that that output buffer is available to receive data.

\* \* \* \* \*